(12) United States Patent
Chen et al.

(10) Patent No.: US 9,110,193 B2
(45) Date of Patent: Aug. 18, 2015

(54) UPSCALING MULTIPLE GEOLOGICAL MODELS FOR FLOW SIMULATION

(75) Inventors: Yuguang Chen, San Ramon, CA (US); Louis J. Durlofsky, Belmont, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 1852 days.

(21) Appl. No.: 12/036,943

(22) Filed: Feb. 25, 2008

(65) Prior Publication Data

US 2008/0234988 A1    Sep. 25, 2008

Related U.S. Application Data

(60) Provisional application No. 60/903,448, filed on Feb. 25, 2007.

(51) Int. Cl.
*G06G 7/48* (2006.01)
*G01V 11/00* (2006.01)

(52) U.S. Cl.
CPC .......... *G01V 11/00* (2013.01); *G01V 2210/665* (2013.01)

(58) Field of Classification Search
CPC .................. G01V 11/00; G01V 2210/665
USPC ........................................... 703/10; 702/1, 10
See application file for complete search history.

(56) References Cited

U.S. PATENT DOCUMENTS

| | | | |
|---|---|---|---|
| 6,106,561 A * | 8/2000 | Farmer ............................. | 703/10 |
| 7,496,488 B2 * | 2/2009 | Jenny et al. ...................... | 703/10 |
| 2003/0028325 A1 | 2/2003 | Roggero et al. | |

FOREIGN PATENT DOCUMENTS

WO    2006/058171 A2    6/2006

OTHER PUBLICATIONS

Bogaert, P., On the Optimal Estimation of the Cumulative Distribution Function in Presence of Spatial Dependence,1999, Springer Netherlands, Mathematical Geology, vol. 31, Issue 2, pp. 213-239.*
Mcqueen, J. 1967. Some methods for classification and analysis of multivariate observations. In Proceedings of the Fifth Berkeley Symposium on Mathematical Statistics and Probability, 281-297.*
Mezghani et al., "Combining Gradual Deformation and Upscaling Techniques for Direct Conditioning of Fine-Scale Reservoir Models to Interference Test Data", Society of Petroleum Engineers, Mar. 2004, pp. 79-86.

(Continued)

*Primary Examiner* — Dwin M Craig
(74) *Attorney, Agent, or Firm* — Pillsbury Winthrop Shaw Pittman, LLP

(57) ABSTRACT

A method, system and machine-readable medium encoded with machine-executable instructions for creating an ensemble of estimated upscaled reservoir models from fine-scale geological models of the subsurface region to produce coarse-scale models of the subsurface region, the method includes computing coarse-scale attributes for a plurality of realizations, numerically simulating coarse-scale properties for a subset of the plurality of realizations, generating calibration data based on the numerically simulated coarse-scale properties and corresponding coarse-scale attributes, and estimating coarse-scale properties for a plurality of realizations, wherein the estimating is done using a statistical procedure and is calibrated using the calibration data to produce coarse-scale properties of an ensemble of upscaled models.

15 Claims, 14 Drawing Sheets

(56) References Cited

OTHER PUBLICATIONS

Menezes et al., "From Logs Scale to Reservoir Scale: Upscaling of the Petroelastic Model", Society of Petroleum Engineers, Jun. 12, 2006, pp. 1-16.

Durlofsky et al., "Scale Up of Heterogeneous Three Dimensional Reservoir Descriptions", SPE Annual Technical Conference and Exhibition, Oct. 22, 1995, pp. 313-326.

International Search Report issued in PCT/US2008/054886, Jun. 26, 2008, 6 pages.

Written Opinion of the International Searching Authority issued in PCT/US2008/054886, Jun. 26, 2008, 7 pages.

International Preliminary Report on Patentability for PCT International Patent Application No. PCT/US2008/054886, mailed on Aug. 26, 2009. 6 pages.

\* cited by examiner (a) Global fine and coarse-scale grids    (b) Local region (a) Relative permeabilities (b) Total mobility ($\lambda$)    (c) Fractional flow function ($f$)

(a) Upscaled $\lambda_x^*$ and $f_x^*$ for coarse-block interface (3, 2)

(b) Upscaled $\lambda_x^*$ and $f_x^*$ for coarse-block interface (3, 7)

(a) Difference of $\lambda$ ($\delta\lambda$)   (b) Difference of $f$ ($\delta f$)

(a) Calibration CDFs of $\delta\lambda_x$ in different clusters (b) Calibration CDFs of $\delta f_x$ in different clusters (a) Total flow rate (b) Oil cut (a) Primitive coarse-scale models (b) Numerically simulated $\lambda^*$ and $f^*$ (global)

(c) Estimated $\lambda^*$ and $f^*$ (global, 3 clusters)

(d) Estimated $\lambda^*$ and $f^*$ (global, 1 cluster)

(a) Primitive coarse-scale models (b) Numerically simulated $\lambda^*$ and $f^*$ (Standard BCs)

(c) Estimated $\lambda^*$ and $f^*$ (Standard BCs)

(d) Numerically simulated $\lambda^*$ and $f^*$ (EFBCs)

(e) Estimated $\lambda^*$ and $f^*$ (EFBCs)

(a) Comparison of CDF of time between fine-scale and coarse-scale models at $F_o = 0.3$ (b) Realization by realization comparison of time at $F_o = 0.3$ (standard BCs)

(c) Realization by realization comparison of time at $F_o = 0.3$ (EFBCs)

(a) Fine-scale models    (b) Primitive coarse-scale models (a) Primitive coarse-scale models (b) Numerically simulated $\lambda^*$ and $f^*$ (EFBCs)

(c) Estimated $\lambda^*$ and $f^*$ (EFBCs, with 10% simulated)

(d) Estimated $\lambda^*$ (EFBCs, with 1% simulated)

(a) Estimated $\lambda^*$ and $f^*$
(EFBCs, with 5.1% simulated)

(b) Estimated $\lambda^*$ and $f^*$
(EFBCs, with 3.2% simulated)

UPSCALING MULTIPLE GEOLOGICAL MODELS FOR FLOW SIMULATION

RELATED APPLICATION

This application claims priority to U.S. Patent Application 60/903,448, filed Feb. 25, 2007, the contents of which are incorporated herein by reference in their entirety.

BACKGROUND

1. Field of the Invention

The present invention relates generally to reservoir flow simulation, and more particularly to methods for upscaling from fine-scale earth models to produce coarse-scale reservoir simulation models.

2. Description of the Related Art

Upscaling is often needed in reservoir simulation to coarsen highly detailed geological descriptions, for example to enable fast flow simulation in complex systems. For this purpose, a number of upscaling procedures have been developed and applied. These techniques generally take as their starting point a fine-scale geological model of the subsurface. The intent is then to generate a coarser model that retains a sufficient level of geological realism of the underlying fine-scale description, for use in flow simulation. Though model sizes can vary substantially depending on the application, typical fine-scale geocellular models may contain on the order of $10^7$-$10^8$ cells, while typical simulation models may contain on the order of $10^4$-$10^6$ blocks.

A variety of upscaling techniques exist and these can be categorized in different ways. One important distinction is in terms of the coarse-scale parameters that are computed by a particular method. Specifically, a technique that generates only upscaled single-phase parameters (i.e., permeability or transmissibility) can be classified as a single-phase upscaling procedure, even though it may be applied to two or three-phase flow problems. A method that additionally generates upscaled relative permeability functions is termed a two-phase upscaling procedure. Another way to distinguish upscaling procedures is according to the problem solved to determine the coarse-scale parameters. In particular, methods may be classified as local, extended local, quasi-global or global (in order of increasing computational effort) depending on the problem solved in the upscaling computations. In general, two-phase upscaling methods are more computationally expensive than single-phase upscaling procedures, as a time-dependent two-phase flow problem must be solved in this case.

In cases where two-phase upscaling is performed, the bulk of the overall computation time (i.e., upscaling plus flow simulation) may be spent in the determination of the coarse-scale two-phase flow functions. Thus it would be very useful to accelerate these upscaling computations. This is particularly desirable in cases with substantial uncertainty in the underlying geological model, in which case many realizations (or scenarios) are to be simulated. In such cases, realization by realization agreement between fine and coarse models is less essential. Rather, what is required in this case is agreement of a statistical nature, for example, agreement in the cumulative distribution functions (or the P10, P50, P90 predictions) for relevant production quantities such as cumulative oil recovered or net present value. The required level of accuracy of the upscaling could be slightly less for such cases, though the method should be unbiased and should provide accurate estimates of the required quantities.

SUMMARY

Aspects of embodiments of the present invention provide a method of upscaling models of a subsurface region from fine-scale geological models of the subsurface region to produce coarse-scale models of the subsurface region, the method including computing coarse-scale attributes for a plurality of realizations, numerically simulating coarse-scale properties for a subset of the plurality of realizations, generating calibration data based on the numerically simulated coarse-scale properties and corresponding coarse-scale attributes, and estimating coarse-scale properties for a plurality of realizations, wherein the estimating is done using a statistical procedure and is calibrated using the calibration data to produce coarse-scale properties of an ensemble of upscaled models.

Aspects of embodiments of the present invention include a system for upscaling models of a subsurface region from fine-scale geological models of the subsurface region to produce coarse-scale models of the subsurface region, the system including a memory, configured and arranged to store data comprising fine-scale model data, a processor configured and arranged to receive the stored data from the memory, and, to, based on the stored data, compute coarse-scale attributes for a plurality of realizations, numerically simulate coarse-scale properties for a subset of the plurality of realizations, generate calibration data based on the numerically simulated coarse-scale properties and corresponding coarse-scale attributes, and estimate coarse-scale properties for a plurality of realizations, wherein the estimating is done using a statistical procedure and is calibrated using the calibration data to produce coarse-scale properties of an ensemble of upscaled models.

Aspects of embodiments of the invention may include a computer-readable medium encoded with computer-executable instructions for performing the foregoing method or for controlling the foregoing system.

Aspects of embodiments of the invention may include a system incorporating the foregoing system and configured and arranged to provide control of the system in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
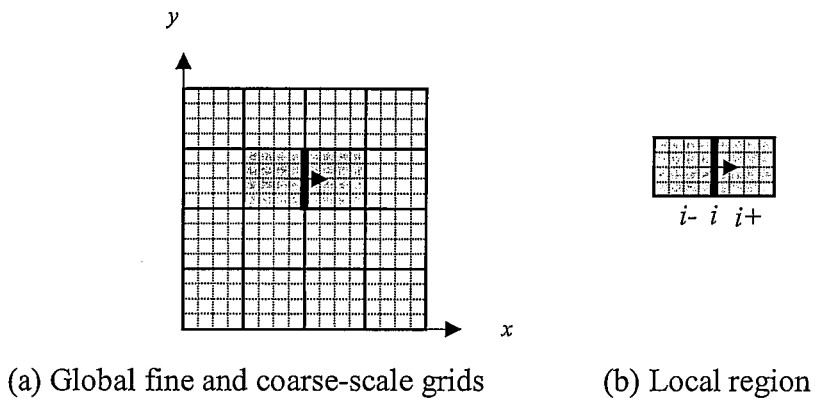
FIGS. 1 *a-b* are schematics showing global fine-scale and coarse-scale grids and local region, containing target coarse-block interface, for upscaling calculations.

The inventors have determined that by coupling upscaling with statistical estimation and simulation techniques, two-phase upscaling for cases involving a number of realizations may be accelerated. While a variety of statistical techniques may be used consistent with the present invention, the inventors determined that K-means clustering may be an especially useful technique.

The approach makes use of full flow-based upscaling calculations for a fraction of coarse-scale blocks. For the rest of the blocks, statistical estimation based on attributes (e.g., velocity information) computed during the single-phase upscaling is used. The method finds application in single and two-phase upscaling procedures.

In simulating viscous-dominated oil and water two-phase systems it is possible to, for convenience, neglect the effects of capillarity, gravity, and compressibility. In this simplified case, the governing equations are formed by combining mass conservation equations with Darcy's law for both phases, and can be expressed in terms of the usual pressure and saturation equations:

$$\nabla \cdot [\lambda(S)k(x) \cdot \nabla p] = 0, \quad \text{(Eq. 1)}$$
$$\phi \frac{\partial S}{\partial t} + \nabla \cdot [uf(S)] = 0.$$

Wherein source terms are omitted for simplicity. In Eq. 1, k is the (diagonal, spatially variable) absolute permeability tensor, p is pressure, S is water saturation, $\phi$ is porosity, x represents physical space, and t is time. Additional quantities are λ(S), the total mobility, defined as the sum of water and oil mobilities, i.e., $\lambda = \lambda_w + \lambda_o = k_{rw}/\mu_w + k_{ro}/\mu_o$, where $k_{rw}(S)$ and $\mu_w$ are the relative permeability to water and water viscosity, and $k_{ro}(S)$ and $\mu_o$ are analogous quantities for oil. The Buckley-Leverett fractional flow function $f(S)$ is defined as $f=\lambda_w/(\lambda_w+\lambda_o)$ and the total Darcy velocity u is computed via u=−λk·∇p. In this work, the system is solved using an IMPES (implicit pressure, explicit saturation) procedure. The pressure equation is solved using a standard finite difference, or more properly finite volume method, while the saturation equation is solved using a second order TVD (total variation diminishing) technique.

As discussed above, coarse models for two-phase flow can be constructed using only upscaled single-phase parameters or using both upscaled single-phase and two-phase parameters. In an embodiment in accordance with the present invention, upscaling is from fine-scale models that are of dimensions 100×100 to 10×10 coarse models, so each type upscaled parameters is computed. Upscaled single-phase flow quantities include equivalent permeability k* or transmissibility T*, where the superscript * denotes the upscaled quantity, while coarse-scale two-phase parameters entail upscaled relative permeability functions $k_{rw}$*(S) and $k_{ro}(S^c)$, or analogously λ*($S^c$) and $f$*($S^c$), where $S^c$ designates the coarse-scale saturation. The coarse-scale flow model is taken to be the same as the fine-scale model (Eq. 1), with the coarse parameters k*, $\phi$*, λ* and $f$* replacing the fine-scale functions:

$$\nabla \cdot [\lambda^*(S^c)k^*(x^c) \cdot \nabla p^c] = 0, \quad \text{(Eq. 2)}$$
$$\phi^* \frac{\partial S^c}{\partial t} + \nabla \cdot [u^c f^*(S^c)] = 0.$$

In Eq. 2, the superscript c indicates a coarse-scale variable. The quantities computed are now the coarse-scale pressure $p^c$ and saturation $S^c$. In this work, porosity is taken as constant.

The primitive coarse-scale model, considered below, involves only upscaled single-phase parameters. Specifically, we compute $k^*$ or $T^*$ (and $\phi^*$) but retain the fine-scale relative permeability functions, i.e., $f^*=f$ and $\lambda^*=\lambda$ in Eq. 2. As will be appreciated by one of ordinary skill in the art, embodiments of the present invention may make use of available more general upscaled models for two-phase flow, which include coarse-scale dispersive terms. Such models may provide improved accuracy in some cases.

Flow-based calculation of the upscaled quantities entails appropriate fine-scale simulations. In general, the accuracy of an upscaling procedure (for single-phase or two-phase flow parameters) depends on the problem that is solved (domain and boundary conditions) to determine the coarse-scale parameters. Following this solution, appropriate averages are computed and the upscaled parameter, which relates these averaged quantities, is determined. The simplest and most computationally efficient approaches use local regions and apply generic boundary conditions. Local region, in this case, means the portion of the fine-scale model corresponding to the target coarse-scale grid block, or the two coarse blocks sharing the target coarse-block interface in the case of transmissibility upscaling. Global fine and coarse-scale grids and a local region for upscaling is illustrated schematically in FIG. 1.

Better accuracy can often be achieved by using larger computational domains for the upscaling. Examples of this are extended local procedures, in which the local domain is extended to include additional portions of the fine-scale model, and global and quasi-global procedures, in which the full global domain is used. In global methods, the full fine-scale model is used for the upscaling computations, while in quasi-global approaches an approximate global solution is applied instead.

Local-global methods for the determination of upscaled single-phase parameters may be used. These approaches use global coarse-scale information to supply boundary conditions for extended local upscaling computations. The procedure is iterated until a self-consistent solution is achieved. Previous work by the present inventors showed that local-global procedures were able to produce high accuracy in coarse-scale models by computing upscaled transmissibility $T^*$ directly, rather than first computing $k^*$ and then calculating $T^*$ from $k^*$. As a result, the particular embodiment discussed below focuses on a transmissibility upscaling approach.

In an embodiment, both local-global and global transmissibility upscaling techniques may be used to improve the accuracy in the upscaled single-phase parameters. On the other hand, the use of global single-phase upscaling techniques is viable in practice if the fine model is of a manageable size. For example, if the steady-state incompressible single-phase pressure equation $\nabla \cdot [k(x) \cdot \nabla p]=0$ can be solved with modest computational effort, such an approach may be used. For cases where this is not practical, then local-global or (extended) local transmissibility upscaling procedures may be used.

The determination of upscaled two-phase functions ($\lambda^*$ and $f^*$, or equivalently $k_{rj}^*$, where j denotes the phase) is often more computationally demanding than the calculation of $T^*$. If global two-phase upscaling methods are applied, time-dependent fine-scale solutions of Eq. 1 may be used and the full fine-scale model is simulated. Such methods may be viable for use in conjunction with a statistical approach if many realizations are to be considered and if the simulation of Eq. 1 on the fine scale for a few of these realizations is possible. Global two-phase upscaling methods have been used and implemented in commercial software.

More efficient local and extended local two-phase upscaling procedures are often the methods of choice for large problems. For these techniques, it has been shown that the boundary conditions imposed on the (extended) local problems can impact the accuracy of the resulting coarse-scale model. Consider the local domain shown in FIG. 1b. This domain includes the fine-scale cells associated with coarse blocks i+ and i−. For the determination of $\lambda^*$ and $f^*$ (or $k_{rj}^*$) at coarse-block interface i, pressure and saturation boundary conditions are required at the left edge and pressure boundary conditions are required at the right edge; no flow conditions are prescribed at the top and bottom. Standard boundary conditions, which are often used for this computation, are as follows:

$$p(0,y)=1, p(L_x,y)=0, S(0,y)=1,$$

$$u_y(x,0)=u_y(x,L_y)=0, \quad (Eq. 3)$$

where $L_x$ and $L_y$ designate the size in the x and y dimensions of the region under consideration.

In incompletely layered systems, it has been shown that these boundary conditions can act to overestimate the movement of injected fluid, and as a result may give coarse models that predict the early breakthrough of injected fluids and overestimate the total flow rate. Specifically, for systems that are layered at the scale of the coarse block, these boundary conditions give $u_x \sim k_x$, where $k_x$ is the fine-scale permeability at boundaries. In an attempt to compensate for this effect, new boundary conditions, called effective flux boundary conditions (EFBCs) have been proposed. These boundary conditions view the inlet and outlet blocks as though they were "inclusions" immersed in a background of equivalent large-scale permeability $k_b$. Here $k_b$ can be thought of as the equivalent global permeability for the entire system. EFBCs act to attenuate the flow rates associated with the high permeability features. The specific boundary conditions for the system shown in FIG. 1b are:

$$u_x(0, y) = \frac{k_x(0, y)}{k_x(0, y) + k_{bx}},$$

$$u_x(L_x, y) = \frac{k_x(L_x, y)}{k_x(L_x, y) + k_{bx}}, \quad (Eq. 4)$$

$$u_y(x, 0) = u_y(x, L_y) = 0.$$

The specific form of Eq. 4 corresponds to the case of "circular inclusions." If the inclusion is considered to be a general ellipse, additional EFBC parameters appear in Eq. 4. In addition, in the case of a system that is layered at the global scale, the appropriate boundary conditions are essentially those given by the standard boundary specification of Eq. 3. Other boundary specifications for saturation are also possible and may lead to improved results in some cases.

For complex permeability fields, it is not always clear which particular boundary specification is optimal for the two-phase upscaling problem. Within the context of ensemble level upscaling, appropriate boundary conditions can be determined by comparing fine and coarse-scale simulation results for one or more realizations. If it is impractical to simulate even a single fine-scale model, a portion of the model can be considered.

As will be appreciated from the foregoing, there are a variety of techniques for both single-phase parameter and two-phase parameter upscaling. In principle, it is possible to use essentially any combination of single and two-phase upscaling techniques, e.g., local-global T* coupled with extended local $\lambda^*(S^c)$ and $f^*(S^c)$ computed using EFBCs. It is noted that different combinations will be optimal for different problems and computational budgets.

As will be appreciated, the determination of the appropriate upscaling method for the problem at hand is an important preprocessing step. Depending on what is practical computationally, extended local, local-global or global methods can be used to compute T*. Similarly, if it is feasible to perform one or more fine-scale two-phase flow simulations, then either global two-phase upscaling can be used or the optimal local two-phase upscaling technique can be determined. Once the particular upscaling methods are established, the statistical estimation techniques described for the rapid determination of $\lambda^*(S^c)$ and $f^*(S^c)$ can be applied. These procedures are applicable for any of the two-phase upscaling procedures described above.

In an embodiment, a statistical estimation procedure is used to generate efficiently the upscaled two-phase flow parameters for multiple geological realizations. In this approach, the ensemble statistics of the fine-scale flow simulation models are of primary import, rather than agreement between the fine and coarse-scale models on a realization by realization basis. In this regard, full flow-based upscaling calculations are performed only for a fraction of coarse blocks in the model (e.g., several realizations). These numerically calculated two-phase parameters ($\lambda^*$ and $f^*$) are then "calibrated" to some readily computed (or already available) coarse-block attributes. This may allow $\lambda^*$ and $f^*$ in other coarse blocks to be estimated statistically, thus avoiding flow-based upscaling calculations.

As a first step, the two-phase flow functions $\lambda^*(S^c)$ and $f^*(S^c)$ are parameterized. A number of approaches to the parameterization of pseudo-relative permeabilities have been proposed, including the use of endpoint relative permeability values, use of three parameters to characterize the fractional flow and total mobility curves, namely, shock front saturation, slope of the fractional flow curve, and the minimum value of the total mobility, discretized pseudo relative permeability curves, and a principal component analysis of the discretized curves, and the use of functional models.

In an embodiment of the present invention, the approach of quantifying the difference between the input fine-scale functions (rock curves) and the upscaled functions is taken. This approach may take advantage of the tendency that for a particular set of fluid properties, the deviation of the upscaled function from the rock curve is mainly driven by the underlying fine-scale heterogeneity.

Figure 2:
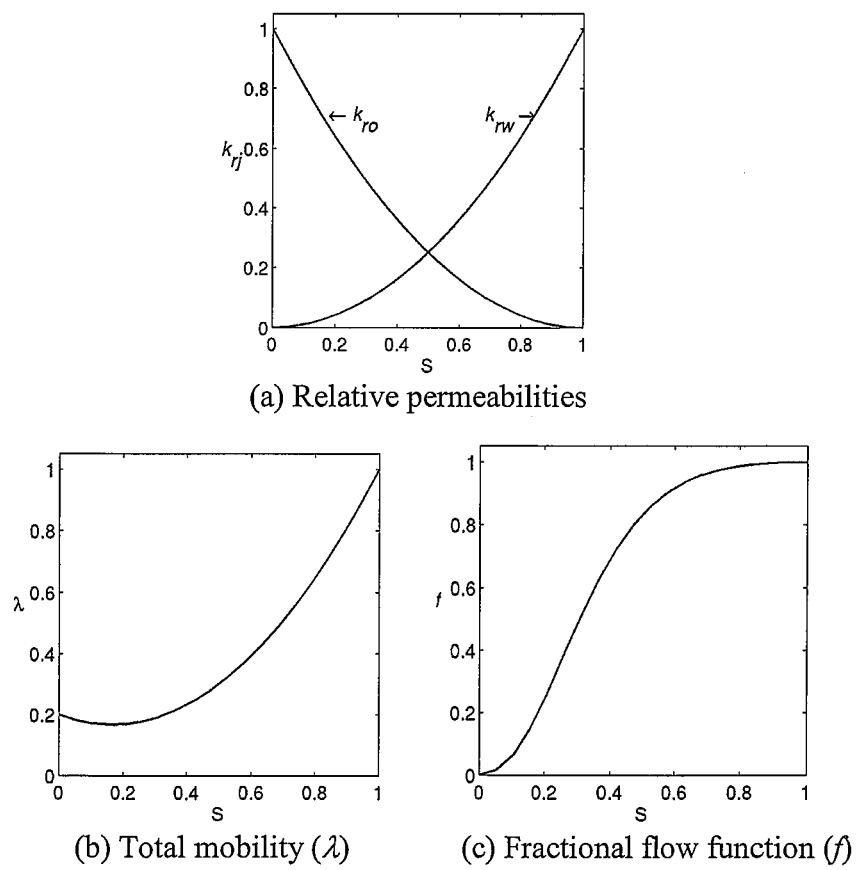
FIGS. 2a-c show fine-scale relative permeabilities and two-phase flow functions for M=5.

Consider two-phase flow with $k_{rw}=S^2$ and $k_{ro}=(1-S)^2$, as displayed in FIG. 2a. For simplicity, take the connate water ($S_{wc}$) and residual oil ($S_{or}$) saturations to be zero, and this set of relative permeabilities is applied to the entire reservoir model. The ensemble level upscaling approach is not constrained to these assumptions and can be applied to more general cases. The total mobility $\lambda$ and fractional flow function $f$ are determined by $k_{rj}$ and the endpoint water-oil mobility ratio M, where $M=\mu_o/\mu_w$, as the endpoint relative permeability values are 1. For a typical oil-water flow (M=5), the $\lambda$ and $f$ functions are shown in FIGS. 2b and c.

Figure 3:
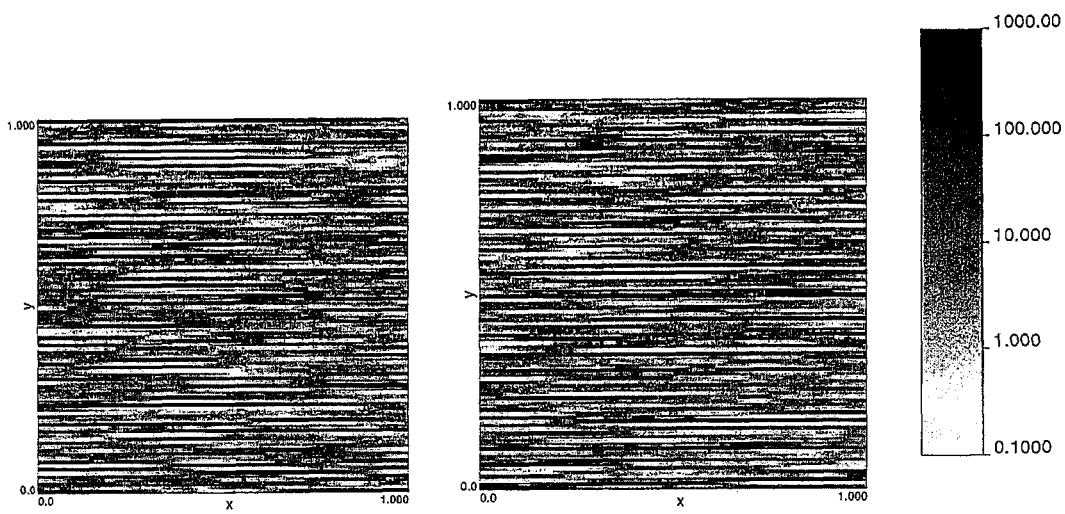
FIG. 3 show two realizations of a variogram-based permeability field ($I_x$=0.4, $I_y$=0.01, and σ=2.0) with a log scale for permeability.
Figure 4:
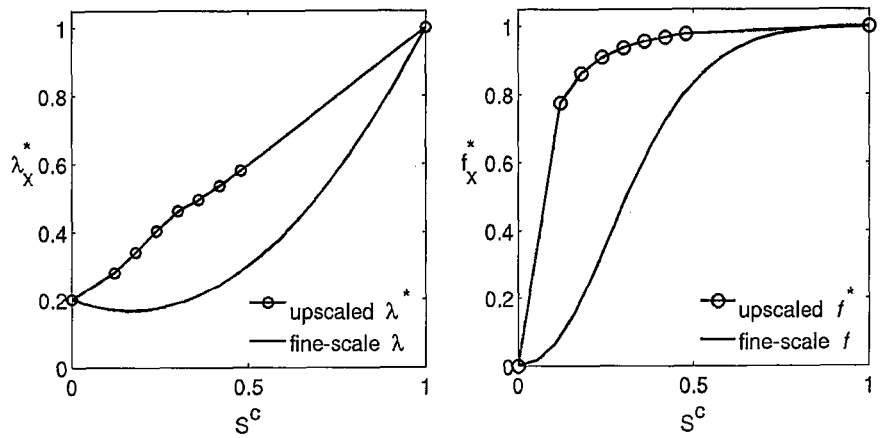
FIGS. 4a-b show upscaled total mobility λ* and fractional flow function $f$* (in the x direction) for two coarse-block interfaces for a variogram-based model ($I_x$=0.4, $I_y$=0.01, and σ=2.0)
Figure 4:
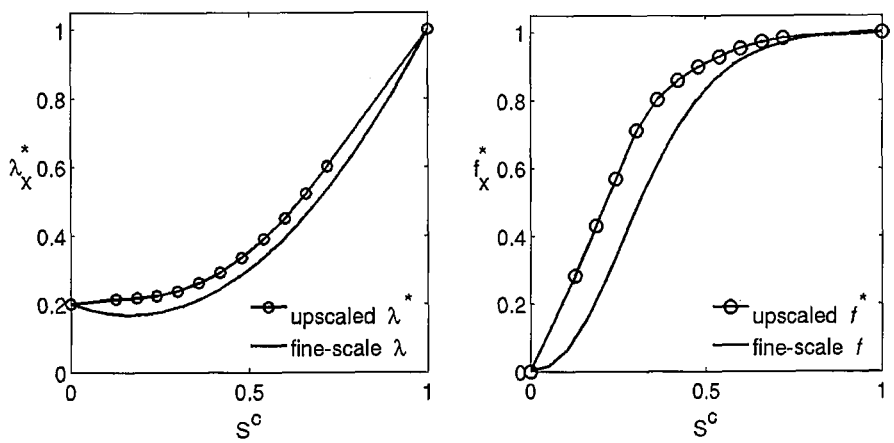

In this example, $\lambda^*(S^c)$ and $f^*(S^c)$ are computed directly, as these are the terms that appear in Eq. 2. Thus the $k_{rj}^*(S^c)$ are not actually constructed, though this can be immediately accomplished if necessary. Note that $\lambda^*$ and $f^*$ are treated as directional (x and y) quantities. For a partially layered system, such as the one illustrated in FIG. 3, the upscaled $\lambda^*$ and $f^*$ in the x direction for two coarse-block interfaces are displayed in FIG. 4. These upscaled representations are obtained using local two-phase upscaling calculations with EFBCs. In this example, for all of the locally computed $\lambda^*$ and $f^*$, a domain consisting of two coarse blocks is used and $\lambda^*$ and $f^*$ at the coarse-block interface are computed, as depicted in FIG. 1b. Note that, although these functions are associated with interfaces, they may be referred to as "coarse-block" functions. It may be seen that for a given $S^c$, the upscaled functions tend to give higher values of the total mobility and fractional flow function. As is typical for upscaled two-phase functions, these act to correct the late breakthrough often encountered in primitive coarse-scale flow models.

Figure 5:
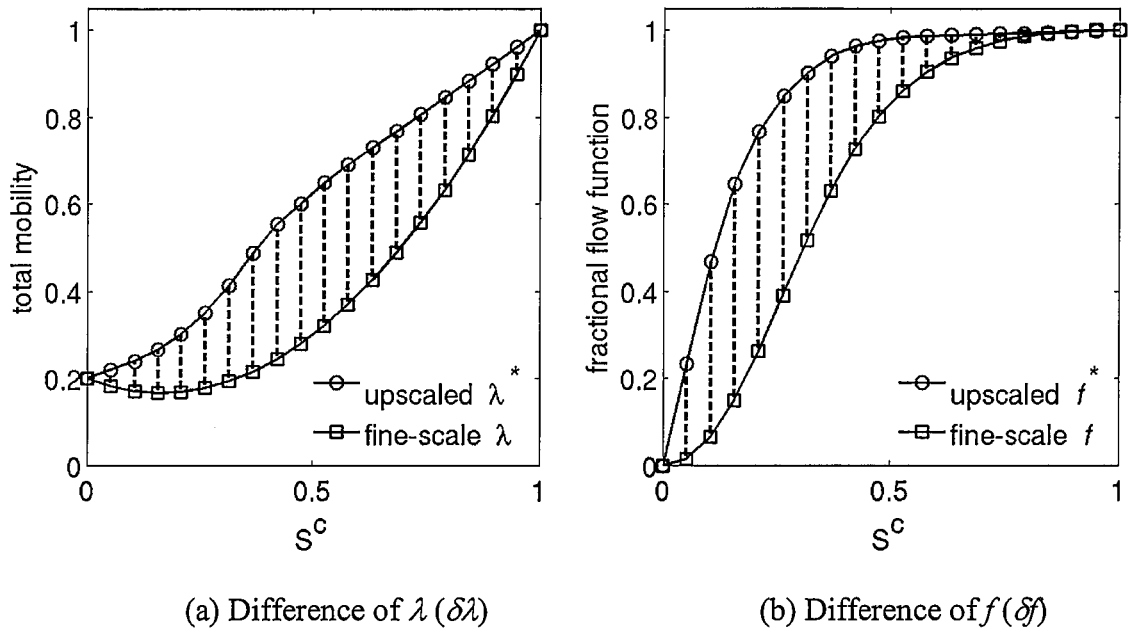
FIGS. 5a-b show a parameterization of upscaled two-phase flow functions.

A difference between the input fine-scale and upscaled functions may be quantified by discretizing both the fine-scale and upscaled functions. As illustrated in FIG. 5, these functions are discretized at N (here N=20) equally spaced saturation values between 0 and 1, or more generally between $S_{wc}$ and $1-S_{or}$. Then the difference between $\lambda^*$ and $\lambda$ (or between $f^*$ and $f$) can be quantified as:

$$\delta\lambda_x = \frac{1}{N}\sum_{i=1}^{N}|\lambda_x^*(S_i^c) - \lambda(S_i^c)|,\qquad\text{(Eq. 5)}$$

$$\delta f_x = \frac{1}{N}\sum_{i=1}^{N}|f_x^*(S_i^c) - f(S_i^c)|,$$

where $S_i^c$ designates a particular saturation value. The quantities in the y direction ($\delta\lambda_y$ and $\delta f_y$) are defined analogously.

This parameterization uses only one parameter to represent each upscaled function, or more precisely, the difference between the upscaled and fine-scale functions. For the case shown in FIG. 5, $\delta\lambda_x=0.184$ and $\delta f_x=0.175$, while for those shown in FIG. 4, $\delta\lambda_x=0.189$ and $\delta f_x=0.211$ for FIG. 4a, and $\delta\lambda_x=0.046$ and $\delta f_x=0.087$ for FIG. 4b. As described above, these values vary based on the fine-scale permeability heterogeneity.

This parameterization may not precisely distinguish individual functions, as two different upscaled curves may give the same (or very similar values) of $\delta\lambda$ (or $\delta f$). However, because in the statistical approach described herein, "exact" representation may not be necessary and one-parameter representations appear to suffice in many cases.

When the parameterization is applied to numerically simulated $\lambda^*$ and $f^*$, the resultant parameters $\delta\lambda$ and $\delta f$ can be quite different for different coarse-block interfaces, depending on the different permeability distributions within coarse-scale blocks. Thus, a next step is to establish some type of "correlation" between the upscaled two-phase flow functions and the coarse-scale blocks. In this regard, coarse-block "attributes" which are indicative of the impact of the underlying permeability heterogeneity on flow are defined. These attributes should be already available or very inexpensive to compute.

By way of example, attributes of this type are the average $<u_x>$ and standard deviation $\sigma_{ux}$ of the single-phase fine-scale velocity. These attributes may be computed over the region corresponding to the two coarse blocks that share the interface at which $\lambda_x^*$ and $f_x^*$ are required. Note that we refer here to an x-oriented interface, though the procedure is analogous for a y-oriented interface. The fine-scale information needed to determine $<u_x>$ and $\sigma_{ux}$ is already available from the determination of the upscaled single-phase flow parameters (e.g., $T_x^*$), so there is essentially no cost associated with their computation. Second, it is known from volume averaging of the fine-scale equations that the subgrid effects that appear in the coarse-scale equations are largely driven by fine-scale velocity fluctuations. The average velocity is also a useful attribute as it provides a direct indication of the impact of permeability on flow.

In an alternate embodiment, in which the ensemble level upscaling is extended and applied to three-dimensional well-driven flows, different attributes may be useful. For example, the coefficient of variation (defined by $\sigma/\langle u \rangle$) and the integral ranges of the autocorrelation functions of the velocity and permeability fields find use.

In an embodiment, a cluster analysis technique which belongs to the general category of classification methods is used. Regression techniques, which take coarse-block attributes as input and provide a continuous output of the upscaled two-phase flow functions ($\delta\lambda$ or $\delta f$), may also be applied.

In an example, 100 fine-scale realizations of a partially layered permeability field are considered. For 10 realizations of the fine-scale model, $\lambda^*$ and $f^*$ in both the x and y directions are computed using flow-based two-phase upscaling. For this example, global two-phase upscaling is applied. The approach will allow estimation of $\lambda^*$ and $f^*$ for the other 90 realizations such that the resultant $\lambda^*$ and $f^*$ functions have relatively unbiased cumulative distribution functions with reference to those computed from numerical simulations.

Figure 6:
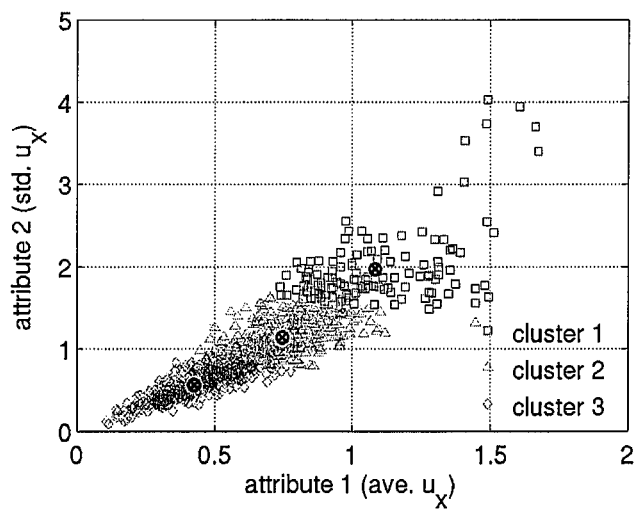
FIG. 6 shows a partitioning of data points (from 10 realizations) into three clusters in the attribute space using data from the variogram-based model shown in FIG. 3.

The parameterization described above is applied to all the numerically simulated $\lambda^*$ and $f^*$, and the coarse-block attributes ($\langle u \rangle$ and $\sigma_u$) are computed for all the coarse-blocks for the 10 realizations. An unsupervised cluster analysis is applied to the coarse-block attributes and the corresponding cumulative distribution functions are computed for the upscaled two-phase flow functions, represented here by $\delta\lambda$ and $\delta f$. A K-means clustering technique is applied to divide the data in the attribute space into different classes. Shown in FIG. 6 is the partitioning of the attribute data ($\langle u_x \rangle$ and $\sigma_{ux}$) into three classes, indicated by different shapes and shades. In the K-means clustering method, the number K of centers is predefined and the distance of each data point to the center of its cluster is minimized iteratively. In FIG. 6, the encircled black crosses designate the cluster centers in the final partition.

Figure 7:
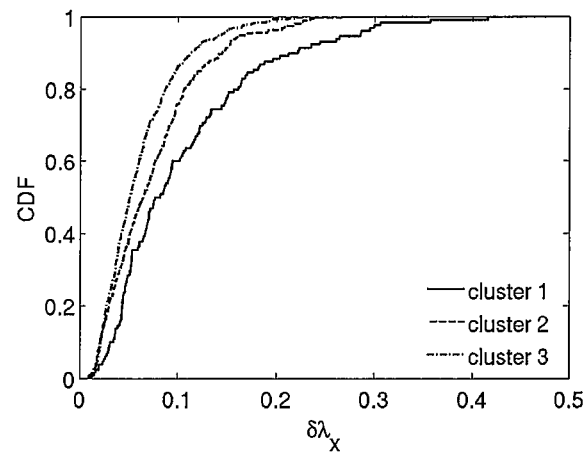
FIGS. 7a-b show calibration CDFs as determined from the data shown in FIG. 6.
Figure 7:
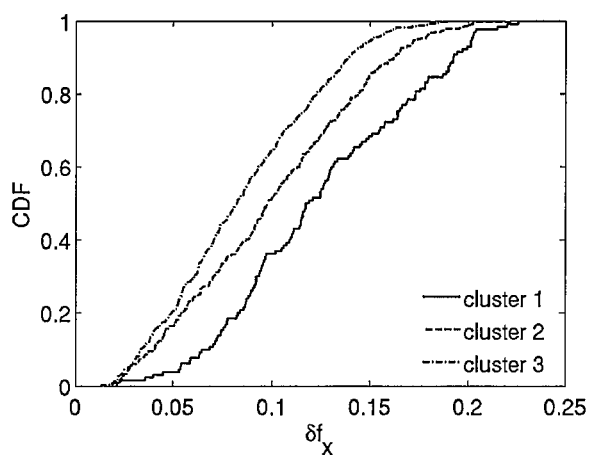

In FIG. 6, there are 1000 data points (10 realizations, each with 100 coarse-block interfaces). Cluster 1 designates coarse blocks with higher $\langle u_x \rangle$ and $\sigma_{ux}$, while cluster 3 corresponds to lower values. Note that the clustering is based on the coarse-block attributes and does not use the parameters for the upscaled two-phase functions ($\delta\lambda_x$ and $\delta f_x$). However, an experimental cumulative distribution function (CDF) of $\delta\lambda_x$ and $\delta f_x$ can be readily computed for each cluster. The resultant CDFs are presented in FIG. 7, where there is a wide range of values of $\delta\lambda_x$ and $\delta f_x$, indicating a variety of upscaled $\lambda_x^*$ and $f_x^*$ functions. Of interest is the statistical correspondence between the distribution of $\delta\lambda_x$ and $\delta f_x$ and the attributes, i.e., higher velocity variations correspond to larger values of $\delta\lambda_x$ and $\delta f_x$, as would be expected.

This cluster analysis may likewise be applied to channelized models. For the channelized case, clustering results are similar to those shown in FIG. 6. In this approach, the CDFs are referred to as the calibration CDFs, and will be used to statistically estimate the $\delta\lambda_x$ and $\delta f_x$ for coarse-block interfaces in other realizations. Noting that the two attributes ($\langle u_x \rangle$ and $\sigma_{ux}$) shown in FIG. 6 are somewhat correlated, these clustering results can likely be improved through the use of other or additional attributes.

Given a coarse-block interface for which $\lambda_x^*$ and $f_x^*$ are to be estimated, we can determine the target cluster based on the coarse-block attributes $\langle u_x \rangle$ and $\sigma_{ux}$. Specifically, if the new data point is closest to the center of cluster 2 in the attribute space, then this coarse-block interface is assigned to cluster 2. Accordingly, the calibration CDFs in cluster 2 (dashed curves in FIGS. 7a and b) are used to assign $\delta\lambda_x$ and $\delta f_x$ to this coarse-block interface. This is performed by applying the inverse CDFs to a random number generated from a uniform distribution. Given enough data points, this ensures that the estimated $\delta\lambda_x$ and $\delta f_x$ for a particular cluster honor the calibration CDFs for that cluster. We verified that the CDFs of the estimated parameters $\delta\lambda_x$ and $\delta f_x$ reproduce the "true" CDFs computed from the numerically simulated $\delta\lambda_x$ and $\delta f_x$.

Though the illustrated embodiment applies a uniform random function, other random functions may be used. For example, sequential Gaussian simulation can be introduced by using a Gaussian random function and taking into account the spatial correlation in the upscaled functions. Other variants are also possible, for example, the joint estimation of $\delta\lambda_x$ and $\delta f_x$. These more sophisticated approaches may provide more accurate results in some cases.

The final step is to transfer the statistically estimated $\delta\lambda_x$ and $\delta f_x$ back to functional forms to be used in flow simulations. For a particular $\delta\lambda_x$ (or $\delta f_x$), the target cluster is searched for the closest values of the calibration $\delta\lambda_x$ (or $\delta f_x$). This functional form is then assigned to the target coarse-block interface. Note that although the assignment of the functional form is deterministic, this step uses the stochastic estimation of the parameters $\delta\lambda_x$ and $\delta f_x$. Thus the overall procedure is a statistical estimation.

A similar procedure is applied to estimate $\delta\lambda_y$ and $\delta f_y$, with attributes being the velocity information in the y direction. For this example, the values of $\delta\lambda_y$ and $\delta f_y$ are much smaller than those in the x direction due to the layered structure of the permeability field.

From the above description, it is clear that in the ensemble level upscaling approach, there is not a one to one correlation, but rather a statistical correlation, between the coarse-block attributes and the upscaled two-phase flow functions. Although the focus on the CDFs does provide an unbiased estimation of these functions, the resulting $\lambda^*$ and $f^*$ cannot be expected to be highly accurate for each individual coarse-block interface. Nonetheless, the inventors have found them sufficiently accurate for efficiently providing upscaled two-phase flow functions for multiple geological realizations and for capturing the ensemble level behavior of the fine-scale models.

In an embodiment, other information about the geological system that is being modeled may be used, for example, information about the depositional environment, well logs, information derived from cores and the like.

EXAMPLE CASES

Three examples are discussed below. These two-dimensional systems include two variogram-based models with different correlation structures and a channelized model. For each case, 100 realizations of the fine-scale model are considered. The objective is to reproduce the ensemble statistics, e.g., P50 prediction and P10-P90 interval, using the coarsened models. Several different upscaling procedures are applied.

Example 1

The first example involves a variogram-based model with $I_x=0.4$, $I_y=0.01$ and $\sigma=2$. The first case involves a log-normally distributed permeability field. The model domain is a square of side length L and it is characterized by dimensionless correlation lengths $I_x=0.4$ and $I_y=0.01$, defined as the dimensional correlation length divided by L. The model possesses a high degree of variability ($\sigma=2$, where $\sigma^2$ is the variance of log k). The permeability distributions are not conditioned to any data and are generated using sequential Gaussian simulation with a spherical variogram model. For these runs, we set $M=\mu_o/\mu_w=5$.

Figure 8:
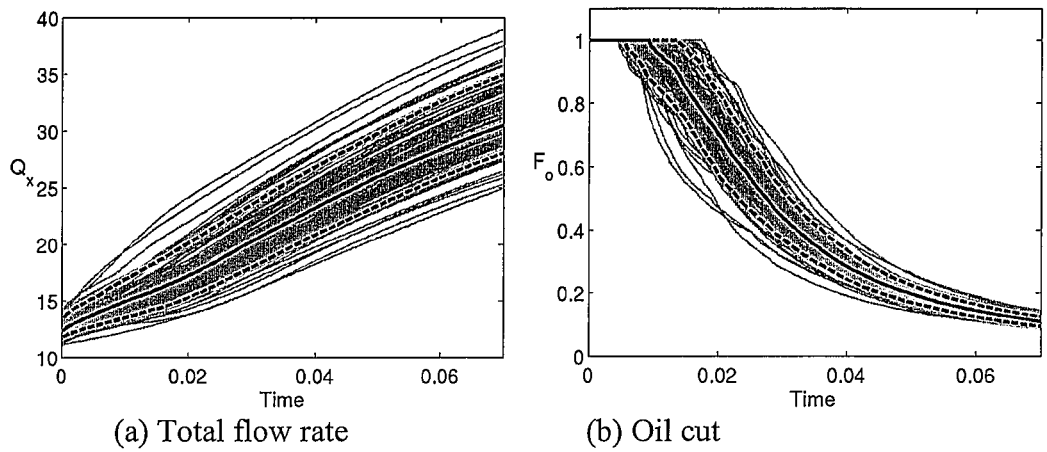
FIGS. 8a-b show flow results for 100 fine-scale models for variogram-based model ($I_x$=0.4, $I_y$=0.01, and σ=2.0) and M=5, the dark central curve represents P50 and the dashed outer curves represent the P10-P90 interval.

The simulations in this and subsequent examples are performed by fixing the pressure at the left and right edges of the model to different constant values. First, fine-scale simulations for the 100 realizations are performed. These results are shown in FIG. 8, illustrating total (oil plus water) flow rate ($Q_x$) at the inlet or outlet edge (these rates are the same as the system is incompressible) versus time and oil cut ($F_o$) versus time for all realizations. Time here and in subsequent figures is nondimensionalized by a characteristic time which is the same for all realizations. A reasonable degree of variation is evident.

In FIGS. 8a and b, the solid black curves designate P50 flow responses, while the dashed black curves designate the P10 (lower curves) and P90 (upper curves) predictions. The P10 and P90 curves are computed such that 10% of the data fall below the P10 curves and 10% of the data fall above the P90 curves. Thus, 80% of the data lie between these two curves. Next the P50, P10 and P90 flow predictions of the fine and various coarse-scale models will be compared. If the instantaneous oil and water flow rates are well preserved, integrated quantities such as cumulative oil production should also be reproduced.

In the first set of results, global single and two-phase upscaling techniques are applied to reduce the upscaling error. In later examples, less expensive, and accordingly less accurate, quasi-global and extended local upscaling procedures are applied.

Figure 9:
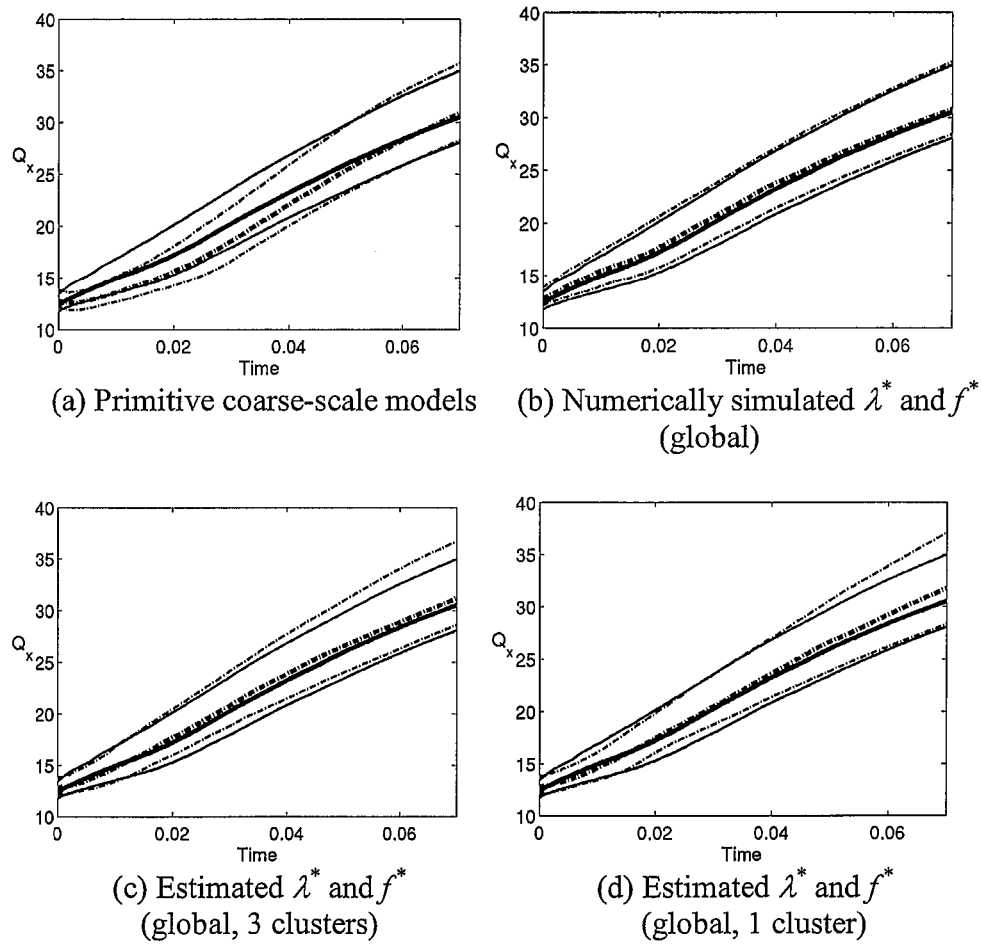
FIGS. 9a-d show a comparison of P50 (thick curves) and P10-P90 interval (thin curves) for total flow rate between fine-scale (solid curves) and coarse-scale (dot-dash curves) models for a variogram-based model ($I_x$=0.4, $I_y$=0.01, and σ=2.0) and M=5.

Results for $Q_x$ for the upscaled models are shown in FIG. 9. In this and all subsequent figures, the solid curves correspond to the fine-scale results, the dot-dash curves to the results for coarse-scale models; the thick curves designate P50 and the thin curves the P10 (lower curves) and P90 (upper curves) predictions. In the primitive coarse-model results (FIG. 9a), global T* along with the fine-scale relative permeability curves are used. For the global pseudo function results (FIG. 9b), global T* is used and global $\lambda^*$ and $f^*$ are computed numerically for each block in each realization, which requires a full fine-scale simulation for each realization. It is apparent that the primitive coarse-model results show some error, particularly at times less than about 0.05, while the global pseudo function model provides accurate results at all times.

Results using the statistical estimation procedure are shown in FIGS. 9c and d. Here, global upscaling is applied to 10 of the 100 realizations and the attributes and upscaled parameters from these 10 simulations (corresponding to a total of 1000 coarse-block interfaces) are used to populate the clusters, as described above. Using these clusters for the statistical estimation of $\lambda^*$ and $f^*$, the results shown in FIGS. 9c (using three clusters) and d (using one cluster) may be generated. Here, by one cluster, is meant that only one CDF is used to populate $\lambda^*$ (or $f^*$) for the coarse blocks to be estimated. Both sets of results show reasonably close agreement between the fine and coarse-scale models for both the P50 and P10-P90 interval. As expected, the results are not quite as accurate as the global pseudo function results in FIG. 9b, for which all $\lambda^*$ and $f^*$ are computed numerically, but they are clearly superior to the primitive model results in FIG. 9a. Interestingly, there is not much difference between the results for $Q_x$ using three clusters and one cluster.

Figure 10:
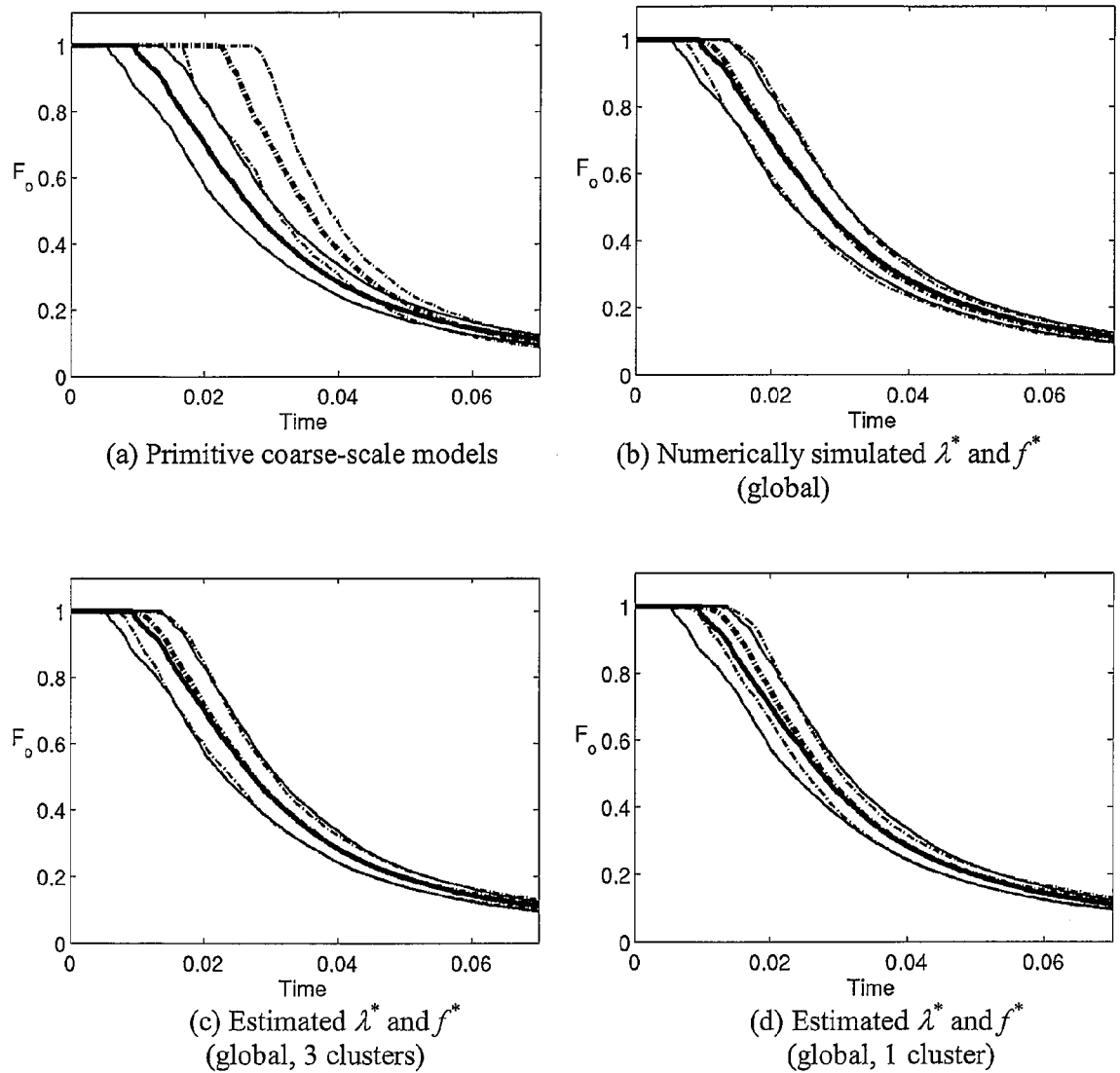
FIGS. 10a-d show a comparison of P50 (thick curves) and P10-P90 interval (thin curves) for oil cut between fine-scale (solid curves) and coarse-scale (dot-dash curves) models for variogram-based model ($I_x$=0.4, $I_y$=0.01, and σ=2.0) and M=5.

FIG. 10 displays results for oil cut for the various procedures. As seen in FIG. 10a, it is apparent that there are significant errors for the primitive model (FIG. 10a) and a high degree of accuracy for the global pseudo function model, for which all blocks in all realizations are upscaled numerically. The results using statistical estimation of the $\lambda^*$ and $f^*$ using three clusters are nearly as accurate as the results for the global pseudo function model, while some degradation is observed when only one cluster is used. This demonstrates that the use of unbiased $\lambda^*$ and $f^*$, even when generated from the CDFs of a single cluster, is able to essentially correct the evident bias in the primitive coarse-scale model.

Figure 11:
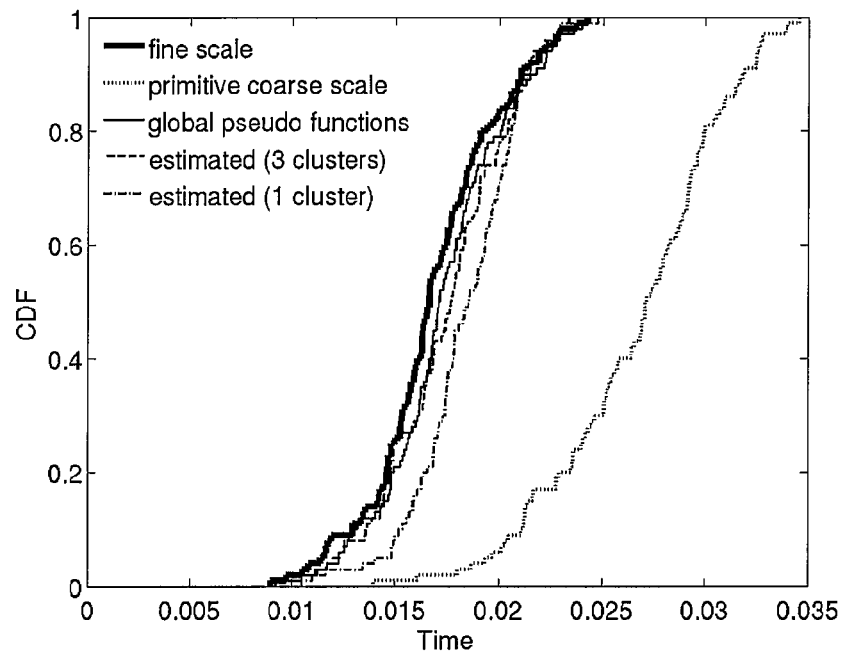
FIG. 11 shows a comparison of CDF of time between fine-scale and coarse-scale models at $F_o$=0.8 for a variogram-based model ($I_x$=0.4, $I_y$=0.01, and σ=2.0) and M=5.
Figure 12:
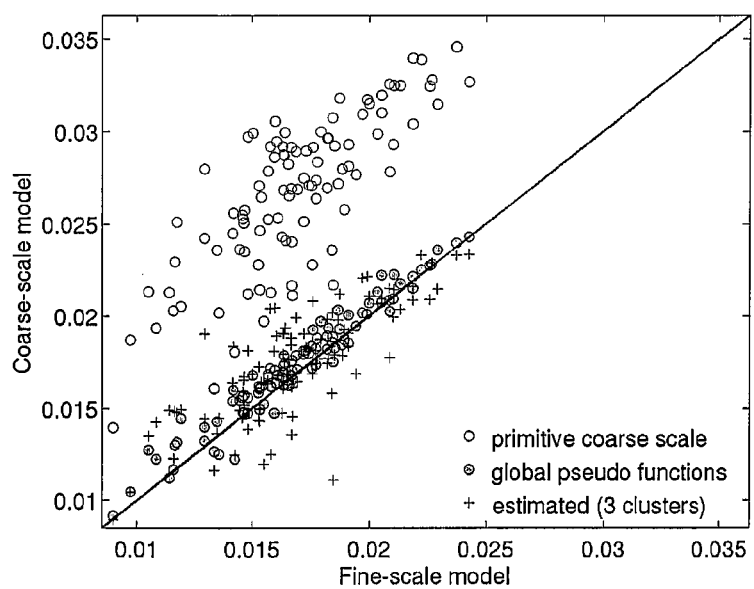
FIG. 12 shows a realization by realization comparison of time between fine-scale and coarse-scale models at $F_o$=0.8 for a variogram-based model ($I_x$=0.4, $I_y$=0.01, and σ=2.0) and M=5.

These observations are further confirmed by additional results for this case, presented in FIGS. 11 and 12. In FIG. 11, we display the CDF of time for a prescribed value of oil cut. These results are generated by drawing a horizontal line at a given value of $F_o$ (here $F_o=0.8$), intersecting the results for all realizations, which can be visualized with reference to FIG. 8b, and plotting the resulting CDF for time. It is evident from FIG. 11 that the primitive model leads to significant error, as is also apparent in FIG. 10a, and that the global pseudo function and estimated pseudo function models provide high degrees of accuracy, though some error is apparent when only one cluster is used.

Realization by realization comparisons are shown in FIG. 12. FIG. 12 shows the time at which $F_o=0.8$ is reached for each model against the result for the corresponding fine model. A perfect upscaling would result in all points falling on the 450 line. The primitive model leads to substantial error and bias, while the global pseudo function results illustrate a high degree of accuracy on a realization by realization basis. The statistical estimation procedure does not provide as high a degree of accuracy as the global pseudo function method, but there is clearly a reasonable correlation and the predictions appear to be essentially unbiased. It may be seen that although there is not perfect agreement at the level of individual realizations, the estimation results do reproduce the ensemble statistics of the fine-scale models, as is apparent in the CDF results in FIG. 11. We note that the results shown in FIGS. 11 and 12 are typical of other values of oil cut.

Example 2

Figure 13:
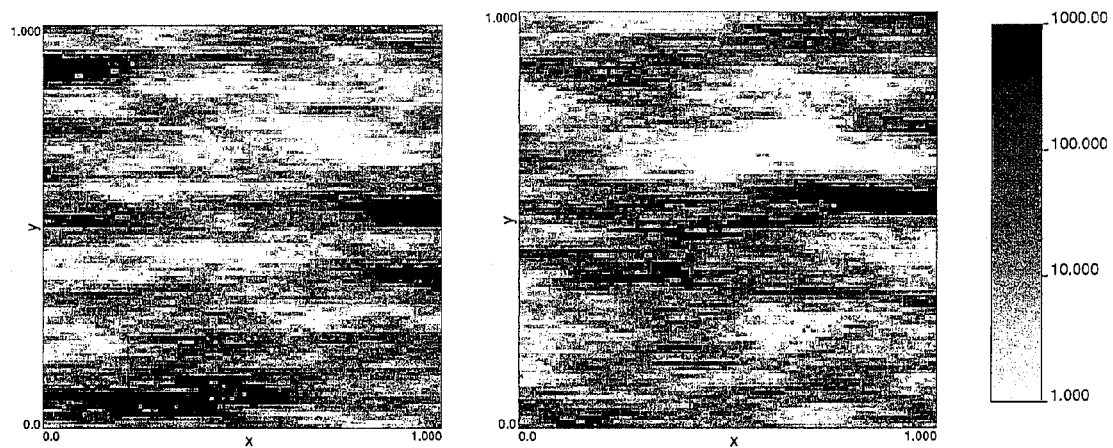
FIG. 13 shows two realizations of a variogram-based permeability field ($I_x$=0.5, $I_y$=0.1, and σ=2.0) with a log scale for permeability.

The second example addresses a variogram-based model with $I_x=0.5$, $I_y=0.1$ and $\sigma=2$. This example likewise relates to a log-normally distributed unconditioned permeability field, however, the correlation structure in this case differs from that in the first example. Two realizations are shown in FIG. 13. EFBCs and standard boundary conditions are used for the numerical computation of $\lambda^*$ and $f^*$. Again, the statistical estimation procedure is used to minimize the number of coarse blocks for which $\lambda^*$ and $f^*$ are generated. For all the models, adaptive local-global upscaling is used to compute T*. For these runs M=50, a much higher mobility ratio is considered.

Figure 14:
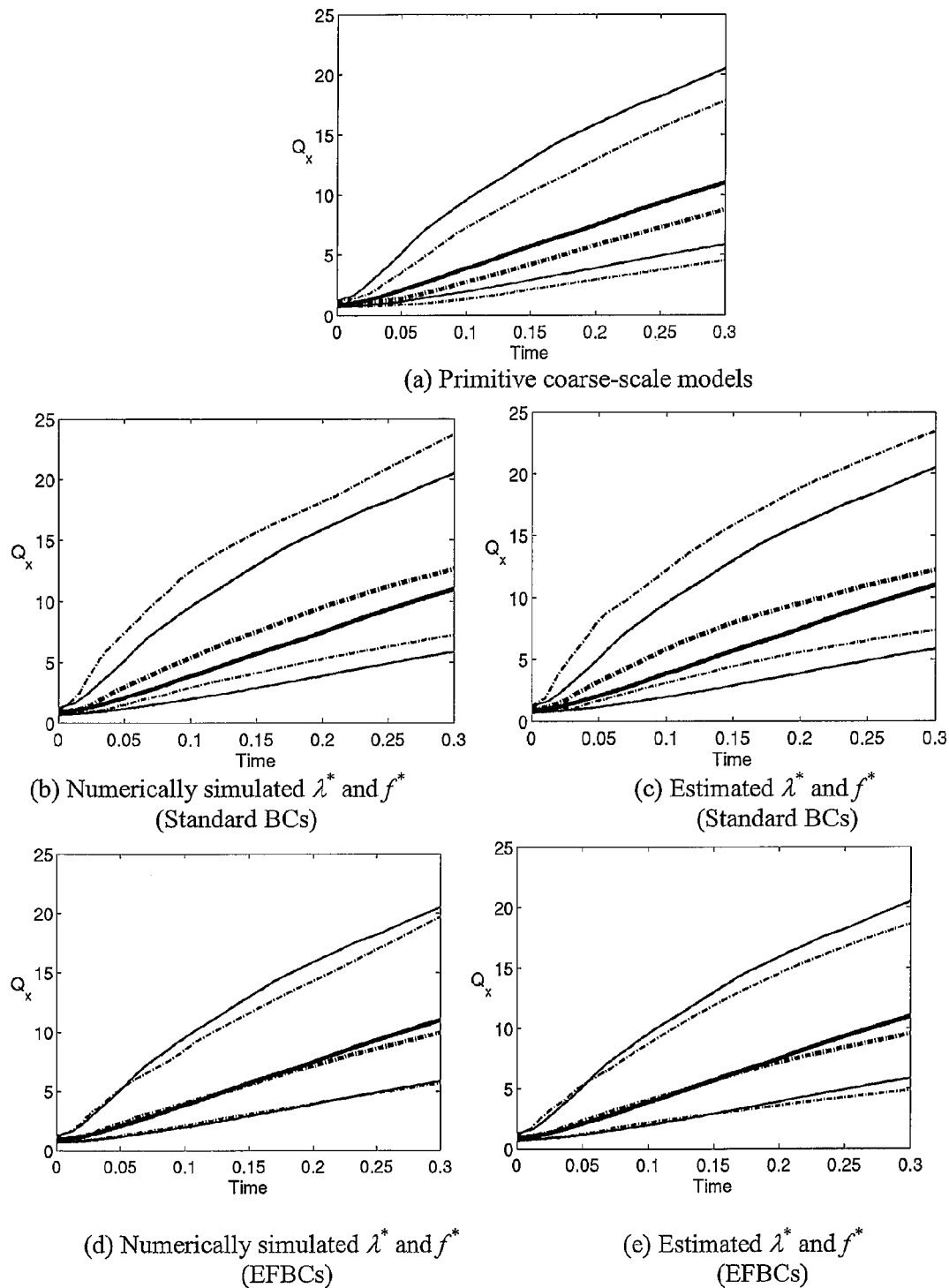
FIGS. 14a-e show comparison of P50 (thick curves) and P10-P90 interval (thin curves) for total flow rate between fine-scale (solid curves) and coarse-scale (dot-dash curves) models for a variogram-based model ($I_x$=0.5, $I_y$=0.1, and σ=2.0) and M=50.

Fine and coarse-scale results for $Q_x$ are shown in FIG. 14. The primitive coarse model (FIG. 14a) leads to biased results, i.e., underprediction of $Q_x$, while the use of standard boundary conditions for the two-phase upscaling (FIG. 14b) leads to systematic overprediction of $Q_x$, even when all pseudo functions are computed. The results using statistical estimation based on the standard boundary conditions (FIG. 14c) are quite similar to those in FIG. 14b. This illustrates that, as expected, the statistical estimation procedure does not in general improve upon the results, or eliminate the bias, from the underlying method—it simply provides a way of generating those results with much less computation.

An improved level of accuracy is observed when EFBCs are applied. Using EFBCs for the upscaling, either through numerical computation for all coarse blocks (FIG. 14d) or through the statistical estimation procedure (FIG. 14e), results for P50 and P10-P90 interval are in reasonably close agreement with the fine-scale realizations. For the results using statistically estimated $\lambda^*$ and $f^*$, $\lambda^*$ and $f^*$ were numerically computed for all coarse-block interfaces in 10 realizations and three clusters were used. Consistent with the results for the previous example, very little degradation in accuracy is observed when the statistical estimation procedure is applied.

Figure 15:
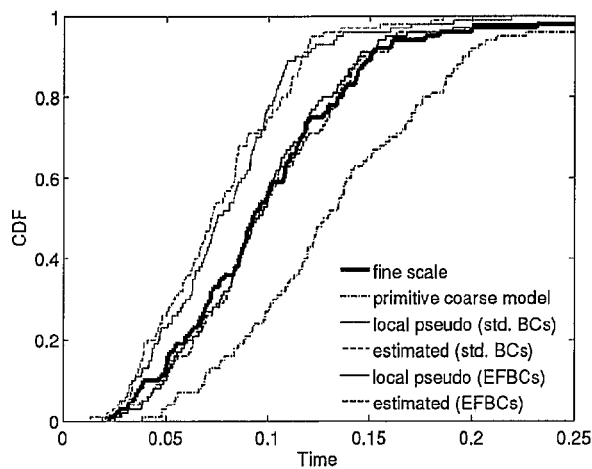
FIGS. 15a-c shows CDF and realization by realization comparison of time at $F_o$=0.3 for a variogram-based model ($I_x$=0.5, $I_y$=0.1, and σ=2.0) and M=50.
Figure 15:
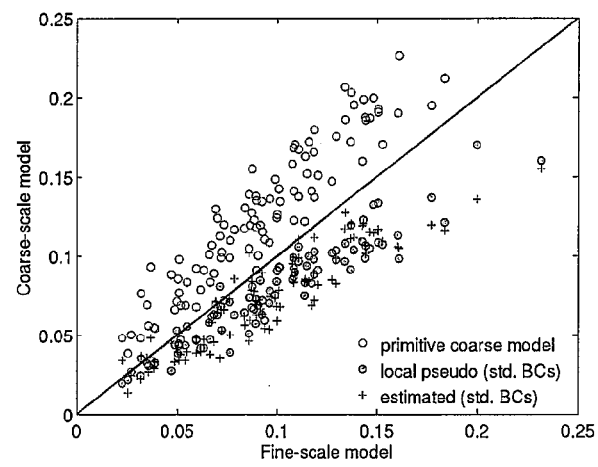
Figure 15:
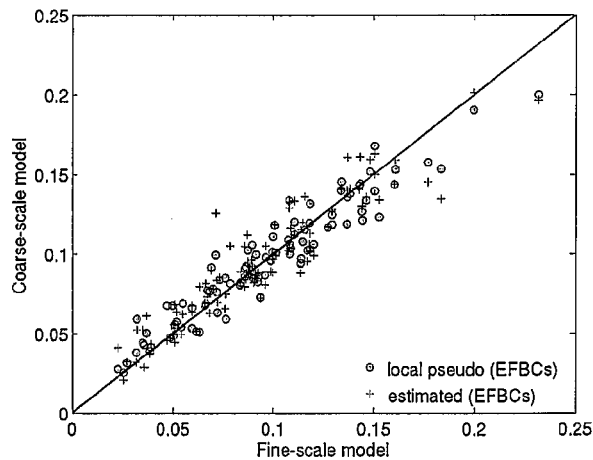

Results for oil cut for this case are comparable to the flow rate results shown in FIG. 14. Oil cut results are compared in FIG. 15 by showing the predicted time for a given oil cut (here $F_o$=0.3) for the coarse-scale and fine-scale models. In FIG. 15, by the designation "local pseudo" either with standard boundary conditions or EFBCs, is meant that $\lambda^*$ and $f^*$ are numerically computed for all coarse blocks in all realizations. FIG. 15a presents the CDF for time at which $F_o$=0.3 is reached. The use of estimated $\lambda^*$ and $f^*$ essentially reproduces the CDF of the corresponding coarse model with numerically simulated $\lambda^*$ and $f^*$. It is also evident that the results from local EFBCs are in close agreement with the fine-scale solutions. The corresponding realization by realization comparisons are shown in FIGS. 15b and 15c. This again demonstrates the biases in the primitive model and coarse model with standard boundary conditions (FIG. 15b) and the unbiased predictions in the coarse model using EFBCs with both simulated and estimated $\lambda^*$ and $f^*$ (FIG. 15c).

Example 3

Figure 16:
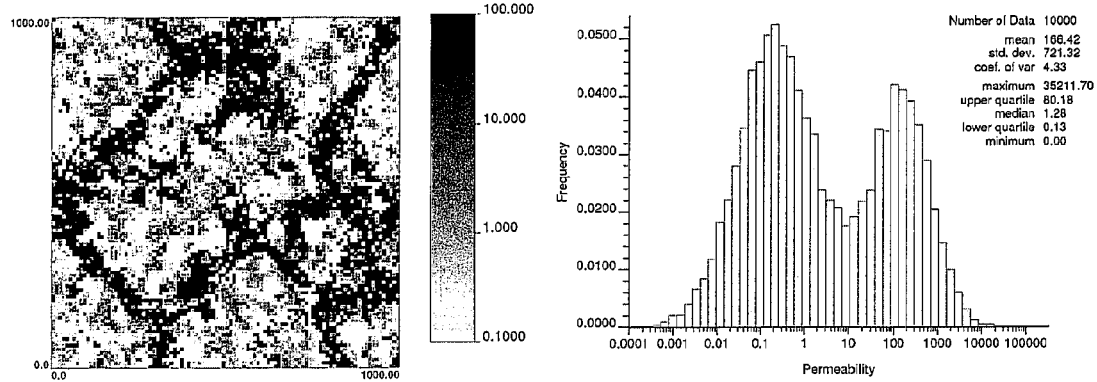
FIG. 16 shows one realization of a channelized permeability distribution (left) and histogram (right) with a log scale for permeability.

The third example addresses a channelized model conditioned to seismic data. The model is generated using multi-point geostatistics for facies (sand and shale) distribution conditioned to seismic data. Unconditioned sequential Gaussian simulation was employed for the permeability distribution within each facies. One realization of the model and the corresponding histogram for permeability are shown in FIG. 16, where the permeability contrast between sand and shale is clear. The coarse models are generated in this case using adaptive local-global (ALG) upscaling to compute T* and EFBCs for the local computation of $\lambda^*$ and $f^*$. The mobility ratio for these runs is five.

Figure 17:
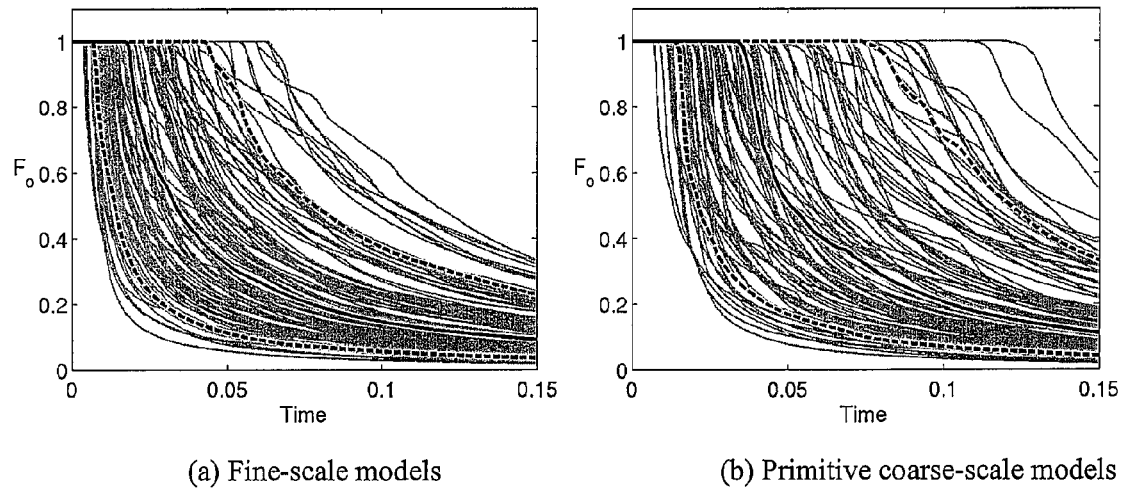
FIGS. 17a-b show oil cut for 100 realizations for channelized model and M=5, the solid black curves represent P50 and dashed black curves indicate the P10-P90 interval.

FIG. 17 displays the oil cuts for the 100 fine-scale realizations and for the primitive coarse-scale models, which use the fine-scale $\lambda$ and $f$. The solid and dashed black curves again indicate the P50, P10 and P90 results. There is clearly significant variation between the realizations, noticeably more than that for the variogram-based model shown in FIG. 8b, and it appears that the spread is even greater in the primitive-model results. This is confirmed in FIG. 18a, where the P50 and P10-P90 interval for $F_o$ for the fine and primitive coarse-scale models are plotted. In this figure, the bias in the primitive model predictions is evident. Shown in FIG. 18b are the results using EFBCs with $\lambda^*$ and $f^*$ computed numerically for all coarse blocks. The error apparent in FIG. 18a is largely eliminated, demonstrating the applicability of EFBCs for this model.

Figure 18:
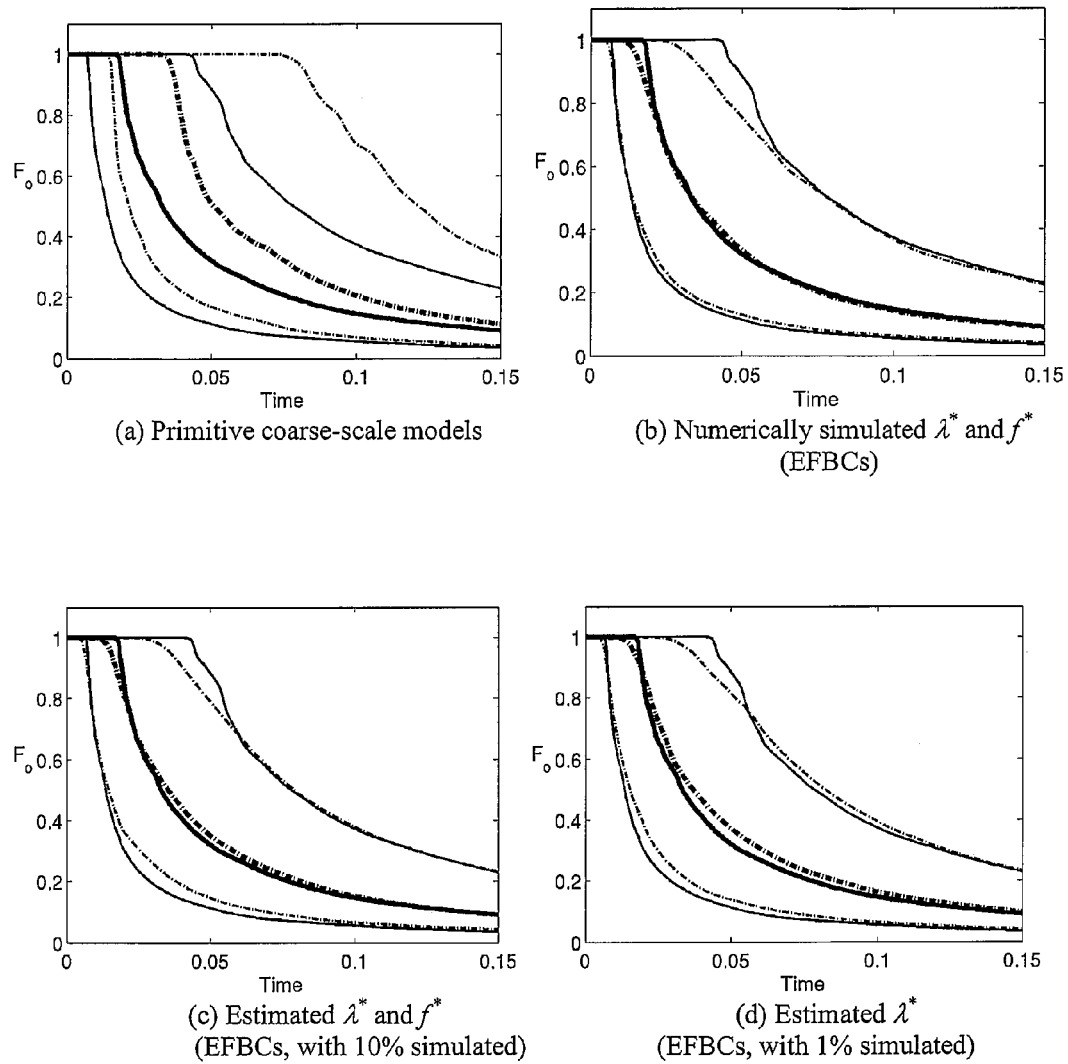
FIGS. 18a-d show a comparison of P50 (thick curves) and P10-P90 interval (thin curves) for oil cut between fine-scale (solid curves) and coarse-scale (dot-dash curves) models for a channelized system and M=5.

FIGS. 18c and 18d illustrate results applying the statistical estimation procedure using 10 realizations and one realization, respectively, for the calibration. In this work, realizations are selected randomly. For the one realization calibration case, only one cluster was used to avoid generating clusters with very few points. The results in FIGS. 18c and d again demonstrate only a slight degradation in accuracy relative to the case in which all $\lambda^*$ and $f^*$ are computed numerically (FIG. 18b). In addition, the use of one realization for the calibration provides results that are nearly as accurate as those using 10 realizations. This implies that a reasonable level of accuracy can be achieved for this case by computing pseudo functions for only 1% of the coarse blocks in the 100 realizations.

A thresholding technique may be employed to determine the coarse interfaces for numerical simulation or statistical estimation of $\lambda^*$ and $f^*$. The thresholding may be based, for example, on single-phase coarse-scale flow rate. This treatment ensures that the $\lambda^*$ and $f^*$ for coarse blocks in high flow regions will be numerically simulated rather than estimated. For each realization, $\lambda^*$ and $f^*$ are simulated for coarse-block interfaces with flow rates that are greater than 80% of the maximum rate for that realization. In addition, all of the interfaces in one or more realizations are simulated to form the clusters used to predict the remaining upscaled functions. Three realizations are used in one case and one realization in the other case for this calibration.

Figure 19:
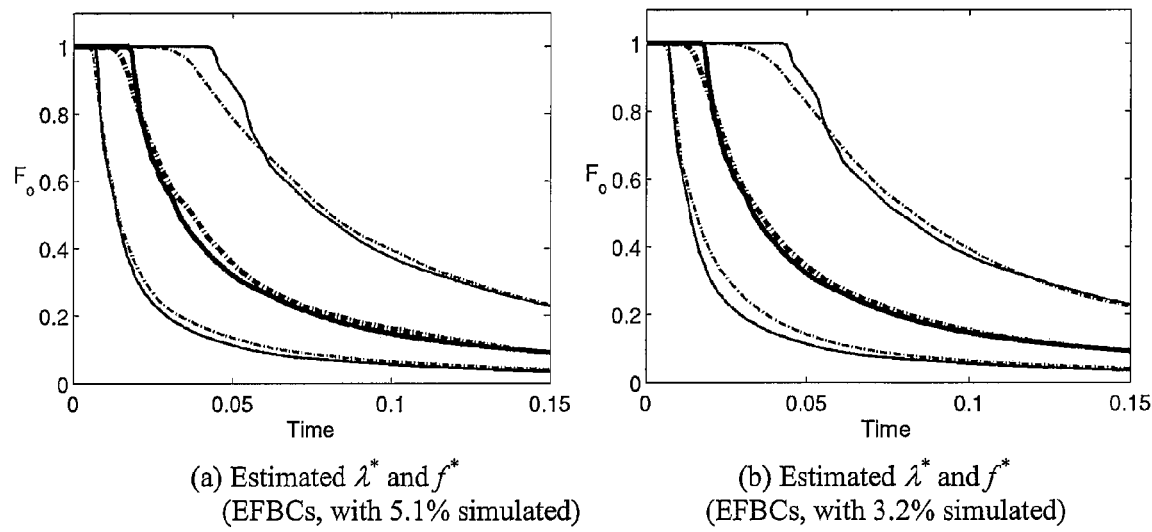
FIGS. 19a-b show comparison of P50 (thick curves) and P10-P90 interval (thin curves) for oil cut between fine-scale (solid curves) and coarse-scale (dash-dot curves) models for channelized model and M=5.

The results are shown in FIG. 19. In FIG. 19a, $\lambda^*$ and $f^*$ are numerically computed for a total of 5.1% of the coarse interfaces, which includes simulations for both the calibration and for high flow interfaces, while for FIG. 19b, $\lambda^*$ and $f^*$ are numerically computed for 3.2% of the coarse interfaces. Note that without simulating the high flow interfaces, the numerically simulated $\lambda^*$ and $f^*$ are 3% and 1%, respectively. It is evident that the results in both FIGS. 19a and b are comparable to or slightly better than those in FIGS. 18c and d, demonstrating the flexibility of the method.

Additional attributes that may be of interest include parameters associated with various facies (e.g., volume fraction of particular facies, volume fraction-weighted endpoints), for example. In this way the fine-scale facies distribution would impact the upscaled two-phase flow functions used for the coarse model. Similarly, if different geological scenarios are to be considered, as opposed to multiple realizations of a particular scenario as considered here, parameters associated with the scenarios could also be used as attributes. Furthermore, deterministic (e.g., regression-type) procedures could be applied to assign coarse-block functions.

Figure 20:
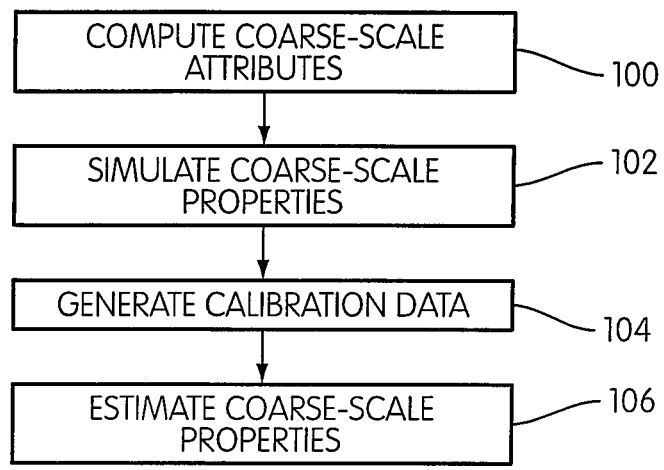
FIG. 20 schematically illustrates a method in accordance with an embodiment of the present invention.

FIG. 20 is a flowchart illustrating an embodiment of a method in accordance with the present invention. Coarse-scale attributes are computed (100) for a plurality of realizations. For a subset of the plurality of realizations, coarse-scale properties are numerically simulated (102). Calibration data is generated (104) based on the numerically simulated coarse-scale properties and corresponding coarse-scale attributes. Coarse-scale properties are estimated (106) for a plurality of realizations, and the estimating is done using a statistical procedure and is calibrated using the calibration data to produce coarse-scale properties of an ensemble of upscaled models.

Figure 21:
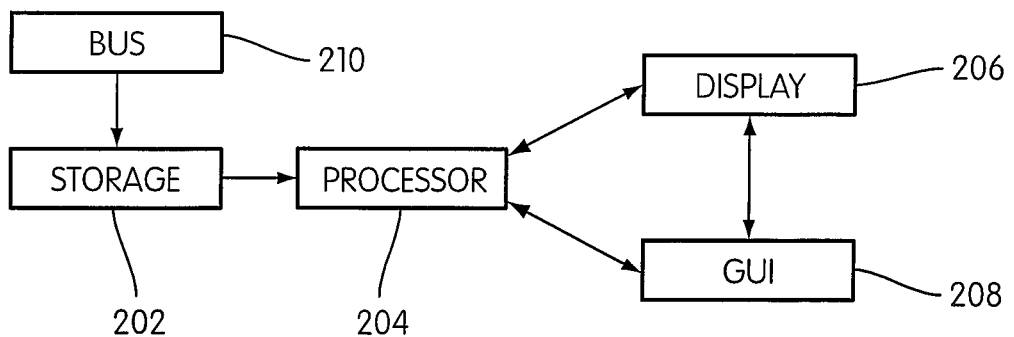
FIG. 21 schematically illustrates a system for performing a method in accordance with an embodiment of the present invention.

A system for performing the method is schematically illustrated in FIG. 21. A system 200 includes a data storage device or memory 202. The stored data may be made available to a processor 204, such as a programmable general purpose computer. The processor 204 may include interface components such as a display 206 and a graphical user interface 208. The graphical user interface may be used both to display data and processed data products and to allow the user to select among options for implementing aspects of the method. Data may be transferred to the system 200 via a bus 210 either directly from a data acquisition device, or from an intermediate storage or processing facility (not shown).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A method of upscaling models of a subsurface region from fine-scale geological models of the subsurface region to produce coarse-scale models of the subsurface region, the method comprising:
   computing coarse-scale attributes for a plurality of realizations;
   numerically simulating coarse-scale properties for a subset of the plurality of realizations;
   generating calibration data based on the numerically simulated coarse-scale properties and corresponding coarse-scale attributes; and
   estimating coarse-scale properties for a plurality of realizations, wherein the estimating is done using a statistical procedure and is calibrated using the calibration data to produce coarse-scale properties of an ensemble of upscaled models.

2. A method as in claim 1, further comprising:
   generating, from the ensemble of upscaled models, statistical descriptions of physical characteristics of the subsurface region.

3. A method as in claim 2, further comprising:
   determining, from the statistical descriptions, a portion of the subsurface region most likely to contain hydrocarbon resources; and
   based on the determining, exploiting the determined portion.

4. A method as in claim 1, wherein the numerically simulating includes upscaling using a flow-based upscaling technique.

5. A method as in claim 1, wherein the generating calibration data comprises using a cluster-based analysis technique.

6. A method as in claim 5, wherein the using a cluster-based analysis technique further comprises dividing the numerically simulated coarse-scale properties into K clusters in an attribute space.

7. A method as in claim 6, wherein the method further comprises:
   creating cumulative distribution functions of upscaled properties for each of the K clusters; and
   using the cumulative distribution functions to estimate the estimated coarse-scale properties.

8. A method as in claim 1, wherein the numerically simulating comprises upscaling for a proportion of realizations less than or equal to 10% of a total realizations to be evaluated and the estimating coarse-scale properties comprises estimating for a balance of the total realizations.

9. A method as in claim 1 wherein the coarse-scale attributes comprise average $<u_k>$ and standard deviation $\sigma_{ux}$ of a single-phase fine-scale velocity.

10. A method as in claim 1, wherein the models comprise three-dimensional flow models.

11. A method as in claim 10, wherein the attributes comprise a coefficient of variation and integral ranges of autocorrelation functions of one or more of velocity and permeability fields.

12. A system for upscaling models of a subsurface region from fine-scale geological models of the subsurface region to produce coarse-scale models of the subsurface region, the system comprising:
   a memory, configured and arranged to store data comprising fine-scale model data;
   a processor configured and arranged to receive the stored data from the memory, and, to, based on the stored data:
      computer coarse-scale attributes for a plurality of realizations;
      numerically simulate coarse-scale properties for a subset of the plurality of realizations;
      generate calibration data based on the numerically simulated coarse-scale properties and corresponding coarse-scale attributes; and
      estimate coarse-scale properties for a plurality of realizations, wherein the estimating is done using a statistical procedure and is calibrated using the calibration data to produce coarse-scale properties of an ensemble of upscaled models.

13. A system as in claim 12, further comprising, a display, configured and arranged to display information relating to the coarse-scale properties to a user.

14. A system as in claim 12, further comprising a bus, connectable to a source of geological and geophysical data to receive therefrom the fine-scale model data.

15. A non-transitory machine-readable storage medium encoded with machine-executable instructions which, when executed cause a computer system to upscale models of a subsurface region from fine-scale geological models of the subsurface region to produce coarse-scale models of the subsurface region, the method comprising:
   computing coarse-scale attributes for a plurality of realizations;
   numerically simulating coarse-scale properties for a subset of the plurality of realizations;
   generating calibration data based on the numerically simulated coarse-scale properties and corresponding coarse-scale attributes; and
   estimating coarse-scale properties for a plurality of realizations, wherein the estimating is done using a statistical procedure and is calibrated using the calibration data to produce coarse-scale properties of an ensemble of upscaled models.

* * * * *